United States Patent [19]

Ogawa

[11] 4,357,374
[45] Nov. 2, 1982

[54] GUEST-HOST LIQUID CRYSTAL DISPLAY DEVICES WITH SILANE SURFACTANT

[75] Inventor: Shoichi Ogawa, Yokohama, Japan

[73] Assignee: Asahi Glass Company Ltd., Tokyo, Japan

[21] Appl. No.: 212,122

[22] Filed: Dec. 2, 1980

[30] Foreign Application Priority Data

Dec. 13, 1979 [JP] Japan .............................. 54-160851

[51] Int. Cl.³ .............................................. B32B 17/10
[52] U.S. Cl. ........................................ 428/1; 428/333; 428/336; 428/339; 428/447
[58] Field of Search ................... 428/1, 333, 336, 339, 428/447

[56] References Cited

U.S. PATENT DOCUMENTS

| 3,973,057 | 8/1976 | Channin | 428/1 |
| 4,004,848 | 1/1977 | Yamazaki | 428/1 |
| 4,083,099 | 4/1978 | Yano | 428/1 |
| 4,151,326 | 4/1979 | Funada | 428/1 |

Primary Examiner—Marion McCamish
Attorney, Agent, or Firm—Oblon, Fisher, Spivak, McClelland & Maier

[57] ABSTRACT

A guest-host liquid crystal display device has tilted homeotropic orientation using a nematic liquid crystal having negative dielectric anisotropy as a host and a dichroic dye as a guest which is prepared by overcoating an inorganic insulating layer; treating said layer to provide orientation; and treating the layer with a silane surfactant.

7 Claims, 3 Drawing Figures

GUEST-HOST LIQUID CRYSTAL DISPLAY DEVICES WITH SILANE SURFACTANT

BACKGROUND OF THE INVENTION

1. Field of the Invention

The present invention relates to a guest-host liquid crystal display device having tilted-homeotropic orientation which include a nematic liquid crystal or a mixed nematic liquid crystal having negative dielectric anisotropy with a dichroic dye.

2. Description of the Prior Art

The guest-host liquid crystal display device is formed by holding a liquid crystal with a dichroic dye between a pair of electrode plates in orientation and changes its display color by varying the orientation of the liquid crystal and the dichroic dye by turning on and off. Various studies for research and development have been made in view of advantageous characteristics of capability of various color displays and broad sight.

In the guest-host liquid crystal display device in which the nematic liquid crystal or the mixed nematic liquid crystal having negative dielectric anisotropy is used as the host and the dichroic dye is used as the guest, it is preferable to attain the orientation treatment so as to maintain less than 10 degree of an angle $\theta_1$ of the orientation of the liquid crystal molecules (2) to the normal direction h on the electrode surface (1) as shown in FIG. 1 in order to increase the contrast ratio by using a polar film. It has been reported to be necessary to provide the shape anisotropy by the oblique evaporation on the surface of the electrode plates which are overcoated and further the orientation treatment with a surfactant giving homeotropic orientation in order to attain such tilted-homeotropic orientation as disclosed in The 24th Japan Applied Physics Conference Pretext 29a-G-3, 1976 by Wada et al. In the oblique evaporation, it is, however, necessary to deposite it at a large angle as about 85 degree of the angle $\theta_2$ to the normal direction h on the electrode surface (1) as shown in FIG. 2 by using SiO as a depositing material. Moreover, an allowable thickness of a deposited layer is quite narrow range as about 50 to 120 Å, to be remarkably inconvenient in the practical use. In such evaporation and the condition of the evaporation, it is difficult to treat a plate having a large area. It is also difficult to attain a mass production. Therefore, the cost is high. As described above, there are various industrial disadvantages to attain the tilted-homeotropic orientation by the surface treatment on the oblique evaporation layer.

SUMMARY OF THE INVENTION

It is an object of the present invention to overcome the above-mentioned various disadvantages in the conventional oblique evaporation technology and to provide liquid crystal display device having excellent tilted homeotropic orientation superior to the liquid crystal display device having tilted homeotropic orientation obtained by the conventional oblique evaporation technology.

The foregoing and other objects of the present invention have been attained by providing an overcoat on an electrode surface and rubbing the overcoat layer with a cotton cloth etc and treating the layer with a surfactant giving homeotropic orientation. The present invention is to provide a guest-host liquid crystal display device using a nematic liquid crystal or a mixed nematic liquid crystal having negative dielectric anisotropy with a dichroic dye which is prepared by overcoating an electrode surface with a selected overcoat material and treating the overcoated surface by a non-vacuum orientation treatment such as a rubbing treatment and then, treating the surface with a selected surfactant giving homeotropic orientation to form the liquid crystal display device for positive display having tilted homeotropic orientation.

DETAILED DESCRIPTION OF THE PREFERRED EMBODIMENTS

Figure 1:
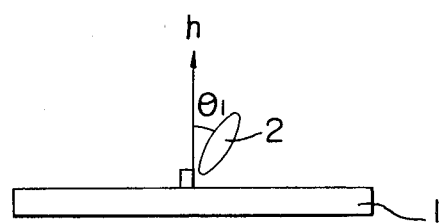
FIG. 1 is a schematic view showing a tilted angle $\theta_1$ of a liquid crystal on a surface of a plate.
Figure 2:
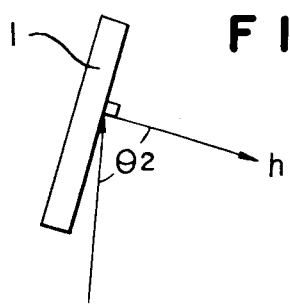
FIG. 2 is a schematic view for illustrating an oblique evaporation.
Figure 3:
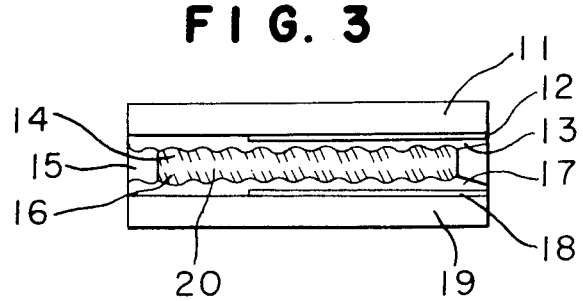
FIG. 3 is a sectional view of one embodiment of a display device according to the present invention.

In the liquid crystal display device of the present invention, as shown in FIG. 3, the electrode is prepared by forming each electrode (12), (18) having a desired pattern on each of the glass plates (11), (19) and treating the surface by a tilted homeotropic surface treatment. The tilted homeotropic surface treatment is attained by forming each insulating layer (13), (17) and treating the layer to give orientation and then treating the surface with a silane type surfactant (14), (16). Various materials can be used for forming the insulating layer and are preferably $TiO_2$, $ZrO_2$, $HfO_2$, $SiO_2$, $GeO_2$, $Al_2O_3$, $CeO_2$, $CaF_2$ and $MgF_2$ and are especially $ZrO_2$ and $Al_2O_3$ because the tilt angle of about 3 to 10 degree is given. It is optimum to use $ZrO_2$ since the tilt angle of about 3 to 5 degree is given. When the tilt angle is zero degree, homeotropic orientation is given by the homeotropic treatment whereby the liquid crystal molecules are disadvantageously fallen at random/at the moment appling the voltage.

If the liquid crystal molecules are in the tilted homeotropic orientation to the specific direction at the moment applying the voltage, the liquid crystal molecules are fallen in the specific direction and the fallen condition is continued during the application of the voltage. If the tilt angle is large, it is visible even in the invisible state. Therefore, it is preferable to give a tilt angle of less than 25 degree especially less than about 10 degree. It is preferable to use $Al_2O_3$ or $ZrO_2$ because the tilt angle can be the minimum for preventing the visible coloring in the invisible state.

As a process for forming the insulting layer, it is preferable to employ known vacuum processes such as a resistance heating evaporation, an electronbeam evaporation, a sputtering process or known chemical processes such as a solution coating process. As a treatment for providing the orientation on the surface of the insulating layer, it is preferable to employ a rubbing process for rubbing in one direction with a cotton cloth or a polishing process for polishing in one direction with a diamond paste, etc. These are the treatments in non-vacuum system and accordingly, the apparatus is economical and the treatment is suitable for the treatment of large substrate.

The silane type surfactants can be selected from the silane surfactants which impart the homeotropic orientation (The organic layer is tilted and accordingly, the silane surfactant is in the tilted homeotropic orientation).

The silane type surfactants are preferably the organic silane compounds having the formula R-SiX$_3$ wherein R represents a long chain alkyl or fluorinated alkyl group having 10 or more carbon atoms especially a $C_{10}$-$C_{20}$ alkyl or fluorinated alkyl group. The alkyl group can be branched if any adverse affect to the homeotropic orientation is given such as methyl group, and the group can include another element or group beside carbon, hydrogen and fluorine atoms. R is preferably a straight chain alkyl or fluorinated alkyl group especially a $C_{16}$-$C_{20}$ alkyl or fluorinated alkyl group to impart homeotropic orientation. X should have a length of ⅓ or less of the length of R. At least two of X should be groups which form hydroxyl groups by hydrolysis. X is preferably halogen atom or an alkoxy group especially a $C_1$-$C_3$ alkoxy group. Three of X are preferably a halogen atom or an alkoxy group.

When an organic silane compound having a $C_{16}$-$C_{20}$ alkyl or fluorinated alkyl group is used in the combination of the insulating layer of $ZrO_2$ or $Al_2O_3$, the optimum tilted homeotropic angle of 3 to 10 degree is given.

When the organic silane compound having an alkyl or fluorinated alkyl group having less than 10 carbon atoms is used, the homeotropic orientation is inferior. When DMAOP (n: n-dimethyl-n-octadecyl-3-aminopropyl trimethoxysilyl chloride) used for the tilted homeotropic orientation by the conventional oblique evaporation, is used with, it is difficult to give a desired result even though the orientation is given on the inorganic insulating layer. The orientation defect for liquid crystal layer is rather less by using the organic silane surfactant.

After the surface treatment, the layer is cured by heating at about 100° to 200° C. for about 3 to 120 minutes.

A pair of the electrode plates are placed with a desired gap and the peripheral parts are sealed with a sealant (15) and the liquid crystal (20) is injected into the space between the electrode plates. The nematic liquid crystal having negative dielectric anisotropy is used as the liquid crystal.

The dichroic dye added to the liquid crystal preferably have large ratio of an adsorbance in the major axial direction to an adsorbance in the minor axial direction (dichroic ratio) of the molecules in the maximum adsorption wavelength of the dichroic dye in the nematic liquid crystal or the mixed nematic liquid crystal having negative dielectric anisotropy. Suitable dichroic dyes include anthraquinone dyes, azo dyes, disazo dyes, styryl dyes and azomethine dyes.

The present invention will be further illustrated by certain examples and references which are provided for purposes of illustration only and are not intended to be limiting the present invention.

EXAMPLE 1

Each oxide layer having a thickness of 800 Å was formed on each of a pair of clean electrode plates by an electrobeam evaporation in an atmosphere of $O_2$ of $1 \times 10^{-4}$ torr. The surfaces of the electrode plates having the oxide layer were treated by the rubbing treatment with the cotton cloth. The electrode plates having the oxide layer treated by the rubbing treatment were dipped in a solution containing 0.5 wt.% of trichlorostearyl silane ($C_{18}H_{37}SiCl_3$) in toluene for 30 seconds and were picked up and washed with toluene to remove excess of trichlorostearyl silane and to form the liquid crystal orientating layer. The electrode plates were cured by heating them at 100° C. for 1 hour and a cell was assmbled with them. A mixed ester type nematic liquid crystal having negative dielectric anisotropy (EN-18 manufactured by Chisso Co. Ltd.) with 0.5 wt.% of azo dichroic dye (GB-9 manufactured by Nippon Kanko Shikiso Co., Ltd.) were injected into the cell to prepare a guest-host liquid crystal display.

The tile angle of the liquid crystal to the normal direction of the substrate, was measured by observing the conoscopic figure by Conoscope (manufactured by Olympus Kogaku Kogyo K.K.). The tilt angle was in a range of 4 to 10 degree. When a voltage of 3.5 V (100 Hz) was applied to the display device, blue display (positive display) was provided on the substantially colorless base to provide broad sight angle. The responsibility at $4^V$ and 100 Hz, was in a range of 350 to 400 msec. for τr and τd.

EXAMPLES 2 to 6 and REFERENCE

Each oxide layer having a thickness of 800 Å was formed on each surface of a pair of clean electrode plates by the electrobeam evaporation in an atmosphere of $O_2$ of $5 \times 10^{-5}$ torr. Each oxide layer was treated by the rubbing treatment with the rubbing cloth No. 6 manufactured by Hiroki Co., Ltd.. Each electrode plate treated by the rubbing treatment was treated by a spinner treatment with a solution containing triethoxystearyl silane ($C_{18}$), triethoxydodecyl silane ($C_{12}$) or triethoxyoctyl silane ($C_8$) in isopropanol at a concentration of 0.1% to form each liquid crystal orientation layer. Each electrode plate was cured by heating at 180° C. for 20 minutes. Each cell was assembled by using the electrode plates to give a cell gap of 10μ. The liquid crystal used in Example 1 was injected into each cell to prepare each guest-host liquid crystal display device.

The conditions, average tilt angles, orientation defects are shown in Table 1. The orientation defect is rated as follows.

⊙ : no orientation defect
○: partial slight orientation defect
X: serious orientation defect

TABLE 1

|  | Inorganic oxide | Silane surfactant | Tilt angle | Orientation defect |
|---|---|---|---|---|
| Example 2 | $ZrO_2$ | $C_{18}$ | 4 | ⊙ |
| Example 3 | $Al_2O_3$ | $C_{18}$ | 10 | ⊙ |
| Example 4 | $SiO_2$ | $C_{18}$ | 14 | ⊙ |
| Example 5 | $CeO_2$ | $C_{18}$ | 21 | ⊙ |
| Example 6 | $ZrO_2$ | $C_{12}$ | 4 | ○ |
| Reference | $ZrO_2$ | $C_8$ | — | X |

The tilt angle was measured by the Conoscope or the magnet-Capacitive method. In Reference, the tilt angle could not be measured because of the orientation defect.

The guest-host liquid crystal display device of the present invention is a color liquid crystal display device which clearly displays and can be easily produced in a mass production. The display device can be superposed if necessary, to a desired filter, a reflection film, a polar film, a printed film or a lighting mean or a multi-layer liquid crystal display device can be prepared as various application.

I claim:
1. A guest-host liquid crystal display device having tilted homeotropic orientation using a nematic liquid crystal having negative dielectric anisotropy as a host and a dichroic dye as guest which is prepared by placing the nematic liquid crystal between two glass plates, each of the glass plates, on the surface facing the nematic liquid crystal, having an electrode thereon; said electrode having been coated with an inorganic insulating layer; said inorganic insulating layer having been treated to provide orientation by being rubbed or polished in a single direction; and coating the so-treated layer with a silane surfactant which imparts homeotropic orientation.

2. The guest-host liquid crystal display device according to claim 1 wherein said inorganic insulating layer is a made of $TiO_2$, $ZrO_2$, $HfO_2$, $GeO_2$, $SiO_2$, $Al_2O_3$, $CeO_2$, $CaF_2$ or $MgF_2$ in a thickness of more than 300 Å.

3. The guest-host liquid crystal display device according to claim 2 wherein said orientation is given by a rubbing or polishing treatment in a non-vacuum process.

4. The guest-host liquid crystal display device according to claim 3 wherein said silane surfactant is an organic silane compound having the formula $$R\text{-}SiX_3$$

wherein R represents a $C_{10}$–$C_{20}$ alkyl group or fluorinated alkyl group; and X represents a halogen atom or an alkoxy group.

5. The guest-host liquid crystal display device according to claim 4 wherein said silane surfactant is an organic silane compound having the formula $$R'\text{-}SiX_3$$

wherein R' represents a $C_{16}$–$C_{20}$ alkyl or fluorinated alkyl group; and X represents a halogen atom or an alkoxy group.

6. The guest-host liquid crystal display device according to claim 2 wherein said inorganic insulating layer is made of $ZrO_2$ or $Al_2O_3$.

7. The guest-host liquid crystal display device according to claim 6 wherein said inorganic insulating layer is made of $ZrO_2$.